(12) United States Patent
Le

(10) Patent No.: US 12,008,329 B2
(45) Date of Patent: *Jun. 11, 2024

(54) SYSTEMS AND METHODS FOR GENERATING DYNAMIC CONVERSATIONAL RESPONSES THROUGH AGGREGATED OUTPUTS OF MACHINE LEARNING MODELS

(71) Applicant: Capital One Services, LLC, McLean, VA (US)

(72) Inventor: Minh Le, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,177

(22) Filed: Jun. 30, 2023

(65) Prior Publication Data
US 2023/0351119 A1 Nov. 2, 2023

Related U.S. Application Data

(63) Continuation of application No. 17/030,059, filed on Sep. 23, 2020, now Pat. No. 11,694,038.

(51) Int. Cl.
G06F 40/35 (2020.01)
G06N 3/045 (2023.01)
G06N 3/088 (2023.01)

(52) U.S. Cl.
CPC ............ *G06F 40/35* (2020.01); *G06N 3/045* (2023.01); *G06N 3/088* (2013.01)

(58) Field of Classification Search
CPC ...... G06F 40/35; G06N 3/0454; G06N 3/088; G06N 3/084; G06N 3/0445; G06N 3/0481
See application file for complete search history.

(56) References Cited

U.S. PATENT DOCUMENTS

| | | | |
|---|---|---|---|
| 11,694,038 B2 * | 7/2023 | Le | G06N 3/044 704/9 |
| 2019/0236482 A1 * | 8/2019 | Desjardins | G06N 3/08 |
| 2019/0362269 A1 * | 11/2019 | Barad | G06F 21/55 |
| 2020/0160178 A1 * | 5/2020 | Kar | G06N 20/20 |
| 2020/0211077 A1 * | 7/2020 | He | G06F 40/20 |
| 2020/0279105 A1 * | 9/2020 | Muffat | G06N 3/08 |
| 2020/0334520 A1 * | 10/2020 | Chen | G06F 40/216 |
| 2021/0104245 A1 * | 4/2021 | Aguilar Alas | G10L 15/16 |
| 2022/0201316 A1 * | 6/2022 | Coelho | H04N 19/96 |

* cited by examiner

*Primary Examiner* — Michael N Opsasnick
(74) *Attorney, Agent, or Firm* — Perkins Coie LLP

(57) ABSTRACT

Methods and systems are described herein for generating dynamic conversational responses. For example, dynamic conversational responses may facilitate an interactive exchange with users. Therefore, the methods and systems used specialized methods to enriched data that may be indicative of a user's intent prior to processing that data through the machine learning model, as well as a specialized architecture for the machine learning models that take advantage of the user interface format.

20 Claims, 8 Drawing Sheets

600

['login:sureswip:login success',
'menu settings:paperless:card paperless on',
'account details:Emergency Widget:CardLock',
'tab bar:home:tapped',
'account details:Emergency Widget:CardLock',
'swiftid:Already subscribed to PAPTRX alert type',
'swiftid:auto enroll:success',
'Bank_bse_cs_offertile_06:Tile:offer tile:shown',
...
'eno app chat:send button',
...
'logout:timeout',
'session Terminated']

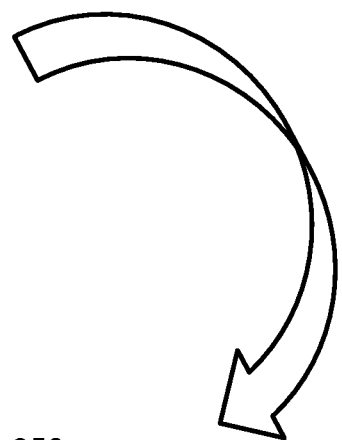

650

| | ← 768 → | | | |
|---|---|---|---|---|
| page view 1 | -2.34 | 1.21 | ... | -0.58 |
| page view 2 | -2.34 | 1.21 | ... | -0.58 |

SYSTEMS AND METHODS FOR GENERATING DYNAMIC CONVERSATIONAL RESPONSES THROUGH AGGREGATED OUTPUTS OF MACHINE LEARNING MODELS

CROSS-REFERENCE TO RELATED APPLICATIONS

This application is a continuation of U.S. patent application Ser. No. 17/030,059, filed Sep. 23, 2020, now U.S. Pat. No. 11,694,038. The content of the foregoing application is incorporated herein in its entirety by reference.

FIELD OF THE INVENTION

The invention relates to generating dynamic conversational responses using independently trained machine learning models.

BACKGROUND

In recent years, the amount and use of interactive programs has risen considerably. In tandem with this rise comes the need to have human-like interactions and/or create applications that provide guidance and options for users. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. For example, dynamic interface options may facilitate an interactive exchange with users. The interactive exchange may include the system responding to one or more user actions (or inactions) and/or predicting responses prior to receiving a user action. In order to maintain the device interface session during the exchange, the system must generate responses that are both timely and pertinent (e.g., in a dynamic fashion). This requires the system to determine both quickly (i.e., in real-time or near real-time) and accurately the intent, goal, or motivation of a user when the user interacts with the system. These interactions or user actions may take various forms including speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely intent of the user.

However, basing recommendations on this type (and/or only one time of information) is problematic. Most applications only have limited features (e.g., a help feature, a contact information feature, etc.) or web pages (e.g., a home page, user account page, etc.); therefore anticipating a user's intent based on his/her selection of features and/or web pages is difficult as users with multiple intents necessarily use the same features and/or web pages. To overcome this technical problem, the system may expand the type and amount of data that it uses to determine an intent.

As the amount and type of data increases and diversifies, identifying patterns within the data, particularly in short amount of time to maintain the conversational interaction, becomes more difficult. Accordingly, the methods and systems rely on machine learning models. Specifically, the system may generate feature inputs based on large and diverse data and train models to determine a likely intent based on those feature inputs. However, even the use of conventional machine learning models does not provide the accuracy needed to correctly identify an intent of the user. Therefore, the methods and systems used specialized methods to enriched data that may be indicative of a user's intent prior to processing that data through the machine learning model, as well as a specialized architecture for the machine learning models that take advantage of the user interface format.

For example, to provide better inputs for the machine learning models, the system and methods may first transform textual sentences (e.g., in a webpage or as found in a current screen on a user device) into vectors of real values. The system may then convert the resulting matrix using a plurality of attention layers functioning in parallel (e.g., in a first machine learning model). The result of this first machine learning model produces an output in which the various real values are multiped with weights of importance. As such the output comprises modified data, which improves the representation of the original text in the matrix.

Additionally or alternatively, the methods and systems use a specialized architecture for the machine learning models that take advantages of the user interface format. For example, ultimately, the most accurate predictor of the intent of the user is a selection made by the user. Therefore, the methods and systems may, as opposed to generating a single conversational response specific to a single intent, may select a subset of dynamic conversational responses from a plurality of dynamic conversational responses. That is, the system may provide the user with several options each representing a given user intent. However, this creates difficulties in selecting a correct loss function for use in selecting the subset of dynamic conversational responses. For example, the use of a binary cross entropy loss function may most accurately rank multiple potential intents. However, a binary cross entropy loss function may most accurately predict the likelihood of any one intent. The use of the two loss functions, for example in an ensemble arrangement, would reduce the accuracy of both loss functions for their intended use. Nonetheless, as the system is selecting a subset of dynamic conversational responses, as opposed to the most likely intent, this reduction in efficiency may be accounted for through the display of the multiple responses in the subset. In particular, the methods and system may average an output of a first and second model (e.g., trained using a multi-class cross entropy loss function and a binary cross entropy loss function, respectively) to provide improves results in the application of generating dynamic conversational responses described herein.

In some aspects, the method or system may generate dynamic conversational responses using multiple machine learning models, the method comprising. For example, the system may receive a first user action during a conversational interaction with a user interface. The system may determine, based on the first user action, a first feature input for a first machine learning model, wherein the first machine learning model comprises a plurality of attention layers functioning in parallel. The system may input the first feature input into the first machine learning model to generate a first output from the first machine learning model, wherein the first machine learning model comprises a plurality of attention layers functioning in parallel. The system may input the first output into a second machine learning model to generate a second output, wherein the second machine learning model comprises a plurality of convolutional neural networks and a Leaky Rectified Linear Unit ("LeakyReLU") activation function. The system may then select a dynamic conversational response from a plurality of dynamic conversational responses based on the second output. The system may generate, at the user interface, the dynamic conversational response during the conversational interaction.

In some aspects, the method or system method may generate dynamic conversational responses through aggregated outputs of machine learning models. For example, the system may receive a first user action during a conversational interaction with a user interface. The system may determine, based on the first user action, a first feature input for a first machine learning model, wherein the first machine learning model is trained using a multi-class cross entropy loss function; determining, based on the first user action, a second feature input for a second machine learning model, wherein the second machine learning model is trained using a binary cross entropy loss function. The system may input the first feature input into the first machine learning model to generate a first output from the first machine learning model. The system may then input the first feature input into the second machine learning model to generate a second output from the second machine learning model. The system may then determine a third output based on a weighted average of the first output and the second output; selecting a subset of dynamic conversational responses from a plurality of dynamic conversational responses based on the third output; and generating, at the user interface, the subset of dynamic conversational responses during the conversational interaction.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the image clearly dictates otherwise. In addition, as used in the specification and the claims, the term "or" means "and/or" unless the image clearly dictates otherwise. Additionally, as used in the specification "a portion," refers to a part of, or the entirety of (i.e., the entire portion), a given item (e.g., data) unless the image clearly dictates otherwise.

BRIEF DESCRIPTION OF THE DRAWINGS

FIG. 6 is an illustrative diagram for processing user actions, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
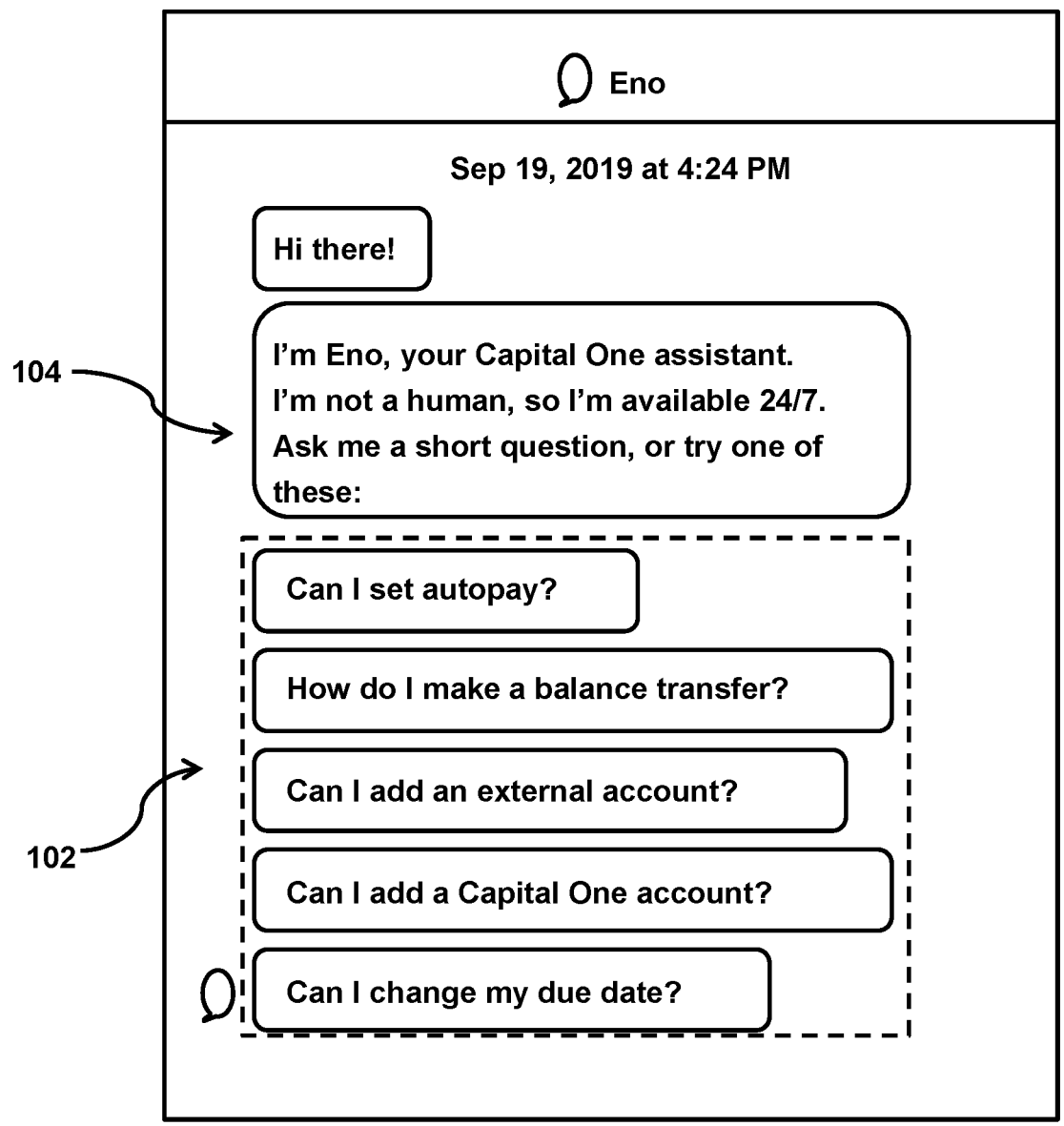
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.).

In order to maintain the conversational interaction, the system may need to generate responses dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

Moreover, the conversational response and/or a subset of conversational responses may be based on an intent of a user. For example, the system may include a recommendation engine which recommends quick replies ("QRs"), or dynamic conversational responses. For example, the system may receive an output from a machine learning model, and use the output to generate a dynamic conversational response. In some embodiments, the system may include a first conversational response (e.g., response 102) and a second conversational response (e.g., response 104). For example, each conversational response may correspond to a potential intent of the user. For example, the system may generate a subset of dynamic conversational responses from a plurality of dynamic conversational responses based on a determined intent of a user.

The system may comprise a model that predicts an intent of a user. For example, the system may determine if a customer intends to make a credit card payment. To do so, the system may monitor a first type of data (e.g., user actions in interface 100) and/or other types of data such as time-dependent user account information (e.g., the due date of a credit card bill, current account balances, etc.). For example, the first type may include a set of text pages, reflecting the contents of the internet drive menu pages. The second type may include a set of numerical and categorical values. The system may then translate the first type of data into data arrays of numbers using natural language processing.

For example, in response to a user action, which in some embodiments may comprise a user logging onto an application that generates user interface 100, inputting a query into user interface 100, and/or a prior action (or lack thereof) by a user in reaction to a prior response generated by the system, the system may take one or more steps to generate dynamic conversational responses, and/or select a subset of dynamic conversational responses. These steps may include retrieving data about the user, retrieving data from other sources, monitoring user actions, and/or other steps in order to generate a feature input (e.g., as discussed below).

In some embodiments, to determine an intent of the user, the system may monitor the interfaces interacted with the user to generate a first feature input. For example, the first feature input may be based on one or more types of data. For example, the data may include data that describes an image currently or previously found in a user interface and/or characteristic, circumstances, and/or users related to the user interface. For example, the system may monitor user action data that may include, user interactions in the user interfaces during a device interface session with the user. The device interface session may include a back-and-forth exchange of ideas and information between the system and the user. The device interface session may proceed through one or more mediums (e.g., text, video, audio, etc.). For example, the system may generate data points such as demographic segments (age, gender, profession, household income), temporal aspects (time of day, season, events), geolocation, and other behavioral data during a device session into order to determine insights into the specifics of the context of usage of a particular digital product or service. For example, when a user engages with a device, the user may multitask between various applications and/or websites. The user may enter and exit device sessions and/or may perform user actions during these device sessions. Each of these engagements with the device may comprise a device session.

The system may also use additional or alternative data to generate the first feature input. The system may receive a first user action (e.g., a user action interacting with user interface 100) from a first user, during a device interface session. The system may then retrieve time-dependent user account information for the first user during the device interface session with the one or more user interfaces. For example, time-dependent user account information may comprise user account information that changes and/or is based on time increments. For example, time-dependent user account information may comprise information on frequency of an account update, information on an account status, and/or information on an account value. In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, a first type of data (e.g., a user action) may include conversation details such as information about a current session, including a channel or platform, e.g. desktop web, iOS, mobile, a launch page (e.g., the webpage that the application was launched from), a time of launch, or activities in a current or previous session before launching the application (as described above in relation to the user interface image data). The system may store this information, and all the data about a device interface session may be available in real-time via HTTP messages and/or through data streaming from one or more sources (e.g., via an API).

In some embodiments, a second type of data (e.g., a time-dependent information) may include user account information, such as types of accounts the user has, other accounts on file, such as bank accounts for payment, information associated with accounts, such as credit limit, current balance, due date, recent payments, recent transactions. The system may obtain this data in real-time for model prediction through enterprise APIs.

In some embodiments, the types of information (e.g., user actions and/or time-dependent information) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

For example, the system may include different supervised and unsupervised machine learning models and human devised rules that may reflect accumulated domain expertise. Specifically, the system may include non-deep Learning classification models that may include, but are not limited to, logistic regression and Naïve Bayesian. The system may include deep learning models that may include neural factorization machines, deep and wide, and multi-modal models. The system may also include sets of human-written rules.

In some embodiments, the system may process transaction data. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)).

In some embodiments, transaction data may include other information as well. For example, information about a source (e.g., address) may be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user based on exchange fee information.

In some embodiments, the transaction data may not be human-readable. For example, network name data may not be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable. In some embodiments, user interface image data may comprise information that represents the combination of linguistic and non-linguistic data models (e.g., as described below in relation to FIG. 3).

Figure 2:
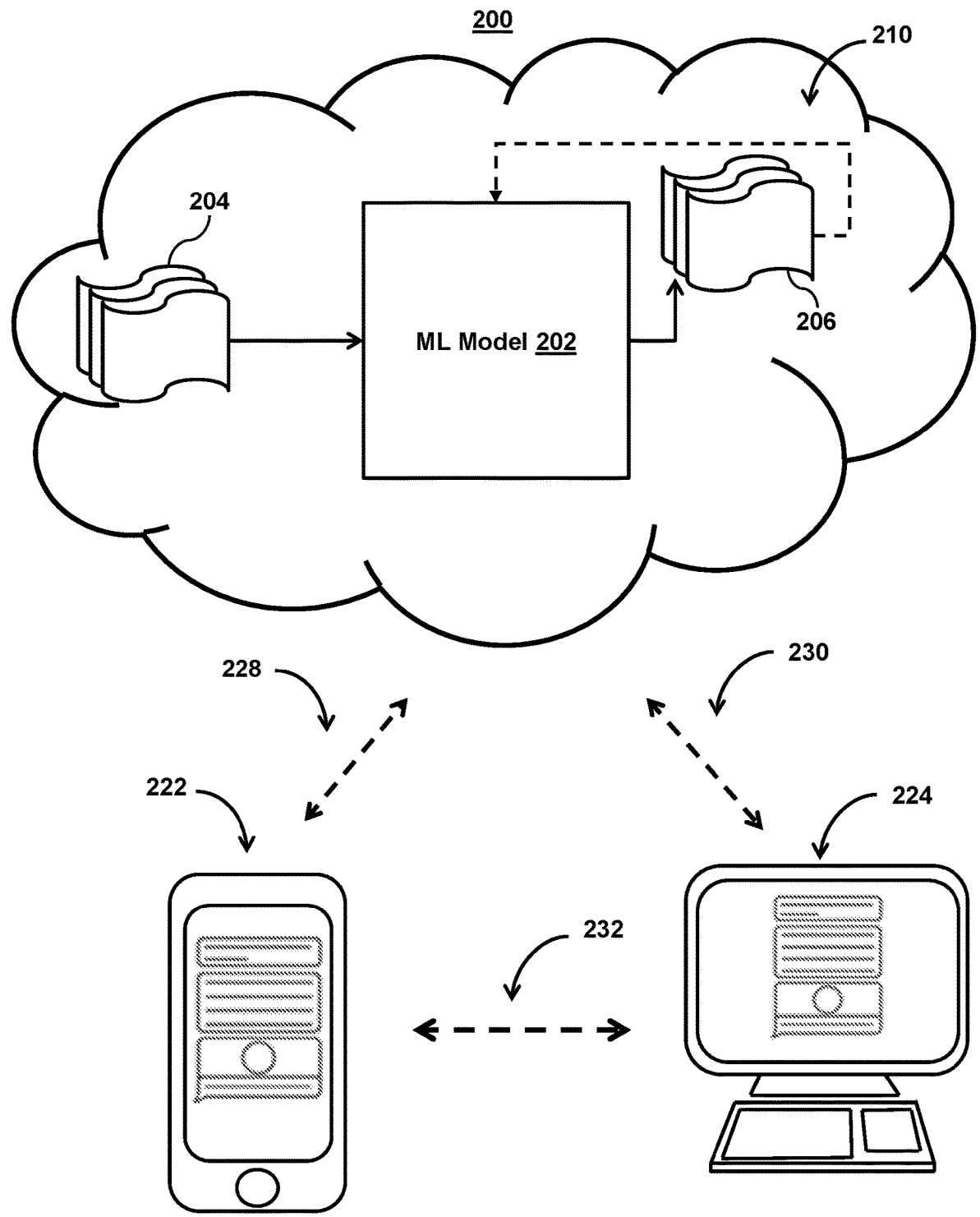
FIG. 2 is an illustrative system for generating dynamic conversational responses using machine learning models, in accordance with one or more embodiments.

FIG. 2 is an illustrative system for generating dynamic conversational responses using machine learning models, in accordance with one or more embodiments. For example, system 200 may represent the components used for generating dynamic conversational responses as shown in FIG. 1. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system and may feature one or more component devices. It should also be noted that system 200 is not limited to three devices. Users, may, for instance, utilize one or more devices to interact with one another, one or more servers, or other components of system 200. It should be noted, that, while one or more operations are described herein as being performed by particular components of system 200, those operations may, in some embodiments, be performed by other components of system 200. As an example, while one or more operations are described herein as being performed by components of mobile device 222, those operations, may, in some embodiments, be performed by components of cloud components 210. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., based on recommended contact strategies).

Additionally, as mobile device 222 and user terminal 224 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.).

Additionally, the devices in system 200 may run an application (or another suitable program). The application may cause the processors and/or control circuitry to perform operations related to generating dynamic conversational responses, or dynamic interface options, using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 5G or LTE network), a cable network, a public switched telephone network, or other types of communications networks or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior transactions. Alternatively, or additionally, the system may act as a clearing house for multiple sources of information about the user. Cloud components 210 may also include control circuitry configured to perform the various operations needed to generate recommendations. For example, the cloud components 210 may include cloud-based storage circuitry configured to store a first machine learning model, wherein the first machine learning model comprises a plurality of attention layers functioning in parallel, a second machine learning model, wherein the second machine learning model comprises a plurality of convolutional layers and a LeakyReLU activation function, a third machine learning model comprising multi-modal stacking. Alternatively or additionally, the cloud-based storage circuitry may be configured to store a first machine learning model, wherein the first machine learning model is trained using a multi-class cross entropy loss function and a second machine learning model, wherein the second machine learning model is trained using a binary cross entropy loss function.

Cloud components 210 may also include cloud-based control circuitry configured to receive a first user action during a conversational interaction with a user interface, determine, based on the first user action, a first feature input for the first machine learning model, determine, based on the first user action, a second feature input for the second machine learning model, input the first feature input into the first machine learning model to generate a first output from the first machine learning model, input the first feature input into the second machine learning model to generate a second output from the second machine learning model, determine a third output based on a weighted average of the first output and the second output, and select a subset of the dynamic conversational responses from a plurality of dynamic conversational responses based on the third output. Alternatively or additionally, the cloud-based storage circuitry may be configured to receive a first user action during a conversational interaction with a user interface, determine, based on the first user action, a first feature input for the first machine learning model, input the first feature input into the first machine learning model to generate a first output from the first machine learning model, input the first output into the second machine learning model to generate a second output, input the second output into the third machine learning model to generate a third output, select a dynamic conversational response from a plurality of dynamic conversational responses based on the third output. Cloud components 210 may also include cloud-based input/output circuitry configured to generate, at the user interface, the subset of the dynamic conversational responses during the conversational interaction.

Cloud components 210 includes machine learning model 202. Machine learning model 202 may take inputs 204 and provide outputs 206. The inputs may include multiple datasets, such as a training dataset and a test dataset. Each of the plurality of datasets (e.g., inputs 204) may include data subsets related to user data, contact strategies, and results. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). For example, the system may receive a first labeled feature input, wherein the first labeled feature input is labeled with a known dynamic conversational response for the first labeled feature input. The system may then train the first machine learning model to classify the first labeled feature input with the known dynamic conversational responses.

In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

In some embodiments, machine learning model 202 may include an artificial neural network (e.g., as described in FIG. 2 below). In such embodiments, machine learning model 402 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202.

In some embodiments, model 202 may predict a goal or intent of a user. This goal or intent may be selected from a plurality of goals and/or intents stored by the system. For example, the system may determine that users who ask different questions about payment have similar account information and digital activities. The system may further determine that the users tend to be different from those of users who have a one-off type request, such as lost card reports or travel notification. In some embodiments, the model (e.g., model 202) may automatically perform actions based on output 206. In some embodiments, the model (e.g., model 202) may not perform any actions on a user's account. The output of the model (e.g., model 202) may be used to decide which dynamic conversational responses to display to a user.

Figure 3:
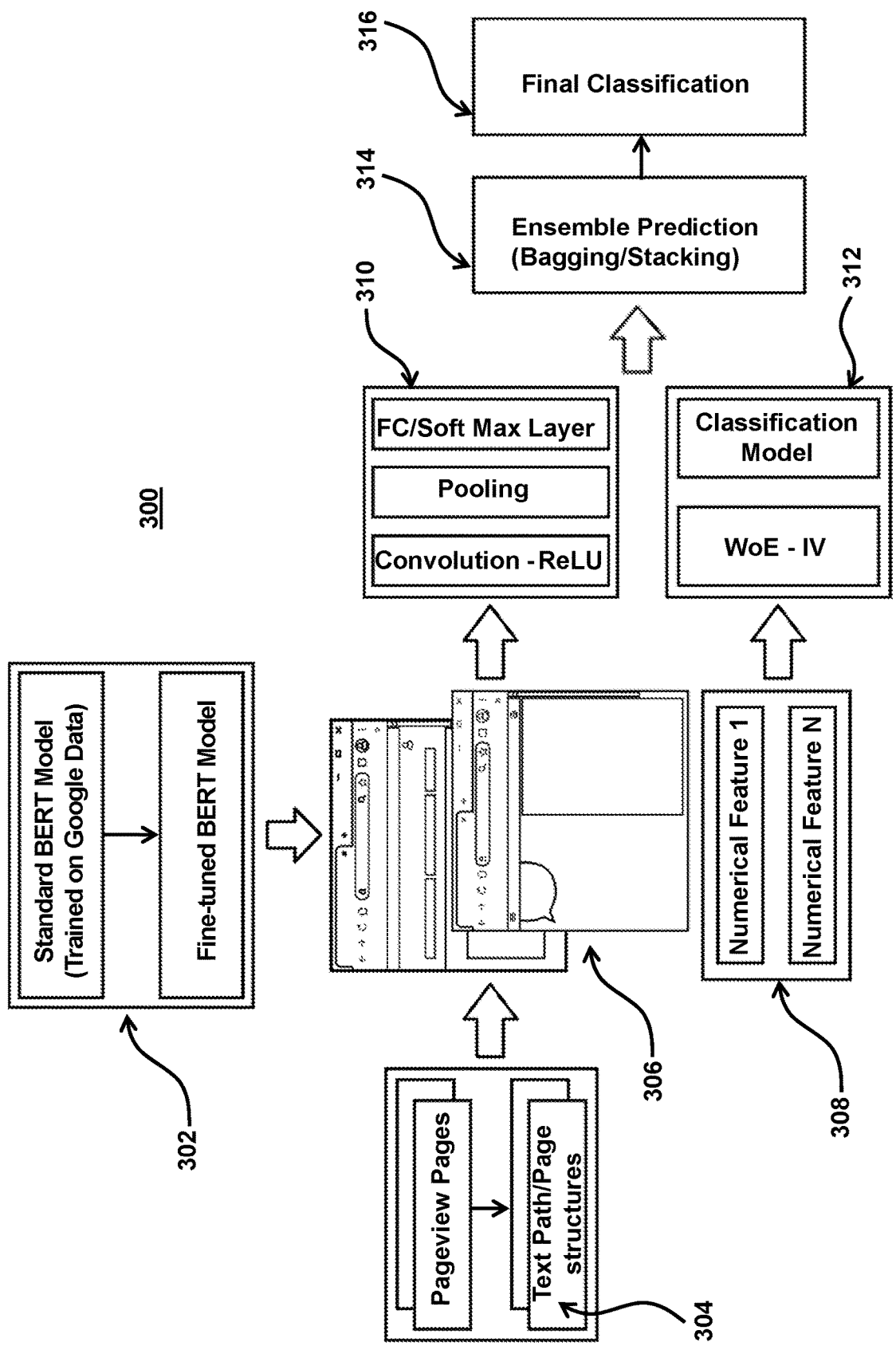
FIG. 3 shows an illustrative system architecture for generating dynamic conversational responses using machine learning models featuring multi-modal feature inputs in accordance with one or more embodiments.

FIG. 3 shows an illustrative system architecture for generating dynamic conversational responses using machine learning models featuring multi-modal feature inputs in accordance with one or more embodiments. System 300 may receive user action data based on user actions with user interfaces (e.g., user interface 100 (FIG. 1)) during a device session. The user action data (e.g., data 304) may include metadata, which may be metadata related to user interfaces (e.g., user interface 100 (FIG. 1)). Metadata may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata may also include information on how the application and/or the website is set up, i.e., how the individual subpages are linked to one another.

Additionally or alternatively, to determine an intent of a user, the system may generate feature inputs as described in FIGS. 5-6 below. Alternatively or additionally, the system may generate data 304 using image recognition and/or object recognition. For example, the system may determine a first user interface image corresponding to the first user action in the user interface. For example, the system may capture, user interface image data such as an image of a current user interface (and/or menus or features being accessed). The system may then apply computer vision techniques to determine metadata or a vector array corresponding to the image. For example, the system may employ computer vision tasks that include acquiring, processing, analyzing and understanding digital images, and extraction of high-dimensional data from the real world in order to produce numerical or symbolic information, e.g., in the forms of decisions.

System 300 may also receive information (e.g., information 302), which may use a Bidirectional Encoder Representations from Transformers (BERT) language model for performing natural language processing. For example, the BERT model includes pre-training contextual representations including Semi-supervised Sequence Learning, Generative Pre-Training, ELMo, and ULMFit. Unlike previous models, BERT is a deeply bidirectional, unsupervised language representation, pre-trained using only a plain text corpus. Context-free models such as word2vec or GloVe generate a single word embedding representation for each word in the vocabulary, whereas BERT takes into account the context for each occurrence of a given word. For instance, whereas the vector for "running" will have the same word2vec vector representation for both of its occurrences in the sentences "He is running a company" and "He is running a marathon", BERT will provide a contextualized embedding that will be different according to the sentence. Accordingly, the system is better able to determine an intent of the user.

In some embodiments, the system may additionally or alternatively, use Embeddings from Language Models ("ELMo"). For example, ELMo is a deep contextualized word representation that models both (1) complex characteristics of word use (e.g., syntax and semantics), and (2) how these uses vary across linguistic contexts (i.e., to model polysemy). These word vectors may be learned functions of the internal states of a deep bidirectional language model (biLM), which may be pre-trained on a large text corpus. ELMOs may be easily added to existing models and significantly improve the state of the art across a broad range of challenging natural language processing problems, including question answering, textual entailment, and sentiment analysis.

In some embodiments, the system may additionally or alternatively, use Universal Language Model Fine-tuning ("ULMFiT"). ULMFiT is a transfer learning technique for use in natural language processing problems, including question answering, textual entailment, and sentiment analysis. ULMFiT may use a Long short-term memory ("LSTM") is an artificial recurrent neural network ("RNN") architecture. The LSTM may include a three layer architecture that includes: general domain language model pre-training; target task language model fine-tuning; and target task classifier fine-tuning.

System 300 may also use transfer learning. For example, transfer learning allows system 300 to deal with current scenarios (e.g., detecting user intent) by leveraging the already existing labeled data of some related task or domain. System 300 may store knowledge gained through other tasks and apply it to the current task. For example, system 300 may use transfer learning to re-fine information into fine-tuned BERT model information that is refined using internal data and/or data related to detecting user intent.

System 300 may then proceed to process this information in first model 310. First model 310 may include a convolutional neural network (CNN) that includes of an input layer and an output layer, as well as multiple hidden layers. The hidden layers of a CNN may include a series of convolutional layers that convolve with a multiplication or other dot product. First model 310 may use an activation function in a RELU layer (and/or LeakyRELU layer), and may subsequently comprise additional convolutions such as pooling layers, fully connected layers and normalization layers, referred to as hidden layers because their inputs and outputs are masked by the activation function and final convolution.

First model 310 may also include a softmax function or a normalized exponential function. The softmax function takes as input a vector z of K real numbers and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

System 300 may also receive numerical data 308 (e.g., time-dependent user account information). Numerical data 308 is input in second model 312. Second model 312 may perform a classification on the time-dependent user account information. Second model 312 may be a fully connected neural network.

System 300 also include other models that may or may note be integrated with system 300. For example, another model may process transaction data. For example, transaction data may include information about one or more transactions (e.g., between the user and one or more merchants). In some embodiments, transaction data may be configured as 2D-array of real numbers with max-censored number of rows and fixed number of columns. For example, the system may incorporate merchants' types/sectors hierarchy in addition to frequency and total amount into a feature input. This model may include a convolutional neural network (CNN) that includes an input layer and an output layer, as well as multiple hidden layers. The hidden layers of a CNN may include of a series of convolutional layers that convolve with a multiplication or other dot product. This model may use an activation function in a RELU layer (and/or LeakyRELU layer), and may subsequently comprise additional convolutions such as pooling layers, fully connected layers and normalization layers, referred to as hidden layers because their inputs and outputs are masked by the activation function and final convolution.

This model may also include a softmax function or a normalized exponential function. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

First model 310 and second model 312 may receive inputs and generate outputs. For example, this output may be processed by third model 314. Third model 314 may then generate a final classification 316. Third model 314 may include ensemble prediction. For example, ensemble methods use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Additionally, third model 314 may include bootstrap aggregating and stacking.

Bootstrap aggregating, often abbreviated as bagging, involves having each model in the ensemble vote with equal weight. In order to promote model variance, third model 314 trains each model in the ensemble using a randomly drawn subset of the training set. As an example, the random forest algorithm combines random decision trees with bagging to achieve very high classification accuracy. In bagging, the samples are generated in such a way that the samples are different from each other, however replacement is allowed. Stacking (sometimes called stacked generalization) involves training a learning algorithm to combine the predictions of several other learning algorithms. First, all of the other algorithms are trained using the available data, then a combiner algorithm is trained to make a final prediction using all the predictions of the other algorithms as additional inputs. If an arbitrary combiner algorithm is used, then stacking can theoretically represent any of the ensemble techniques described in this article, although, in practice, a logistic regression model is often used as the combiner. Stacking typically yields better performance than any single one of the trained models. It should be noted that in some embodiments first model 310 and second model 312 and/or additional models may be combined into or more models (e.g., may comprise a single model).

Figure 4:
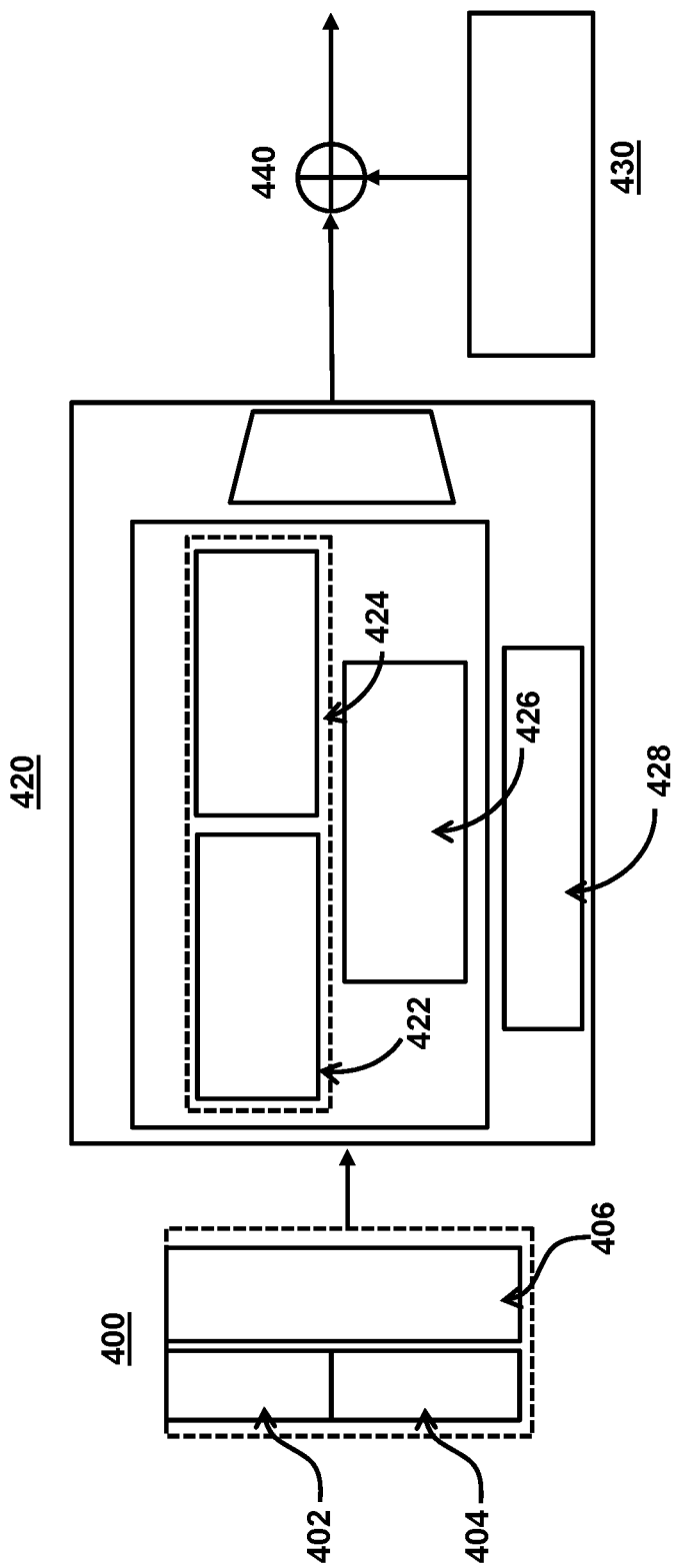
FIG. 4 is an illustrative system for generating dynamic conversational responses through aggregated outputs of machine learning models, in accordance with one or more embodiments.

FIG. 4 is an illustrative system for generating dynamic conversational responses through aggregated outputs of machine learning models, in accordance with one or more embodiments. In some embodiments, one or more components of system 400 may correspond to one or more components of system 300 (FIG. 3)).

System 400 includes a first model (e.g., model 420) and a second model (e.g., model 410). Model 410 and model 420 may process, and be trained on, similar data. For example, each of model 410 and 420 may receive an input of a feature input and generate an output. The architecture of model 410 and model 420 may be the same and/or may have one or more distinguishing elements. For example, model 420 may be trained using a multi-class cross entropy loss function, whereas model 410 may be trained using a binary cross entropy loss function. For example, cross-entropy loss, or log loss, measures the performance of a classification model whose output is a probability value between 0 and 1. A multi-class cross entropy loss function results in a distribution of probabilities that sum to 1, whereas a binary cross entropy loss function results in a distribution of probabilities that may not sum to 1.

For example, a multi-class classification classifies instances into one of three or more classes, whereas classifying instances into one of two classes is called binary classification. Multi-class classification techniques can be categorized into (i) transformation to binary (ii) extension from binary and (iii) hierarchical classification. Furthermore, a one-vs.-rest strategy involves training a single classifier per class, with the samples of that class as positive samples and all other samples as negatives. For example, the system may use base classifiers to produce a real-valued confidence score for its decision, rather than just a class label. For example, discrete class labels alone can lead to ambiguities, where multiple classes are predicted for a single sample.

System 400 may further include an aggregation function (e.g., function 440) that may average an output from model 410 and model 420. For example, that system may determine an output from function 440 that is based on a weighted average of an output from model 420 and an output from model 410. Function 440 further comprise determining a first weight for a first output (e.g., an output from model 420) and a second weight for a second output (e.g., an output from model 410), wherein the first weight is greater than the second weight (e.g., the first weight is twice the second weight). In some embodiments, the system (e.g., as function 440) may determine a weight based on a number of models included within each of model 410 and model 420. For example, model 410 and model 420 may include sub-models that each generate an output for determining an intent of the user. The system may determine the weight based on the number of these models. For example, if model 410 includes one model that generates one output and model 420 includes two models that generates two outputs collectively, the system may weigh the output from model 420 twice the output of model 410.

Model 420 may include multi-head self attention model 422. For example, multi-head attention allows a model to jointly attend to information from different representation subspaces at different positions. With a single attention head, averaging inhibits this. Multi-head self attention model 422 may comprise a plurality of attention layers functioning in parallel. For example, model 422 may include "encoder-decoder attention" layers, in which queries come from the previous decoder layer, and the memory keys and values come from the output of the encoder. This allows every position in the decoder to attend over all positions in the input sequence. This mimics the typical encoder-decoder attention mechanisms in sequence-to-sequence models. The encoder contains self-attention layers. In a self-attention layer, all of the keys, values and queries come from the same place, in this case, the output of the previous layer in the encoder. Each position in the encoder can attend to all positions in the previous layer of the encoder. Similarly, self-attention layers in the decoder allow each position in the decoder to attend to all positions in the decoder up to and including that position. We need to prevent leftward information flow in the decoder to preserve the auto-regressive property. We implement this inside of scaled, dot-product attention by masking out all values in the input of the softmax which correspond to illegal connections.

Model 420 may itself to include model 424, which may include a plurality of convolutional neural networks and a LeakyReLU activation function. For example, in some embodiments, model 424 may comprise a convolution layer. The convolution layer may use one or more convolution filters, or kernels, that run over the feature input and compute a dot product. Each filter extracts different features from the feature input (e.g., as described in FIG. 6 below). For example, an algorithm used by model 424 may process a value in a feature input according to its position in the feature input. For example, model 424 may be trained to use spatial interactions between values in the feature input. For example, convolution layer may use information from adjacent values to down-sample the feature input into features by convolution, and then use prediction layers to predict target values. Model 424 may also include a pooling layer. For example, a max pooling layer may reduce the spatial size of the convolved features in the feature input, and also helps reduce over-fitting by providing an abstracted representation of them. Model 424 may also include a LeakyReLU activation function. Activation functions may introduce non-linearity to model 424, which allows it to learn complex functional mappings between the inputs and response variables. In some embodiments, model 424 may use activation functions, such sigmoid, tanh, ReLU, Leaky ReLU, etc.

Model 420 may also include other models (e.g., model 426). For example, model 426 may be a fully connected model that process time-dependent user information and/or other numerical data. For example, in a fully connected layer the input layer nodes are connected to every node in the second layer. The system may use one or more fully connected layers at the end of a CNN. By adding a fully-connected layer, the system learns non-linear combinations of the high-level features outputted by the convolutional layers.

Model 420 may also include model 428, which may include XGBoost. XGBoost is an optimized distributed gradient boosting library designed to be highly efficient, flexible and portable. It implements machine learning algorithms under the Gradient Boosting framework. XGBoost provides a parallel tree boosting (also known as GBDT, GBM) that solves problems in a fast and accurate way.

Model 420 may also include an ensemble layer (e.g., layer 430). Layer 430 may combine the outputs from multiple base models into a single score. For example, outputs from base-level models are used as input features which may be used to train the ensemble function. In some embodiments, the ensemble function may be a linear combination of the base model scores.

Figure 5:
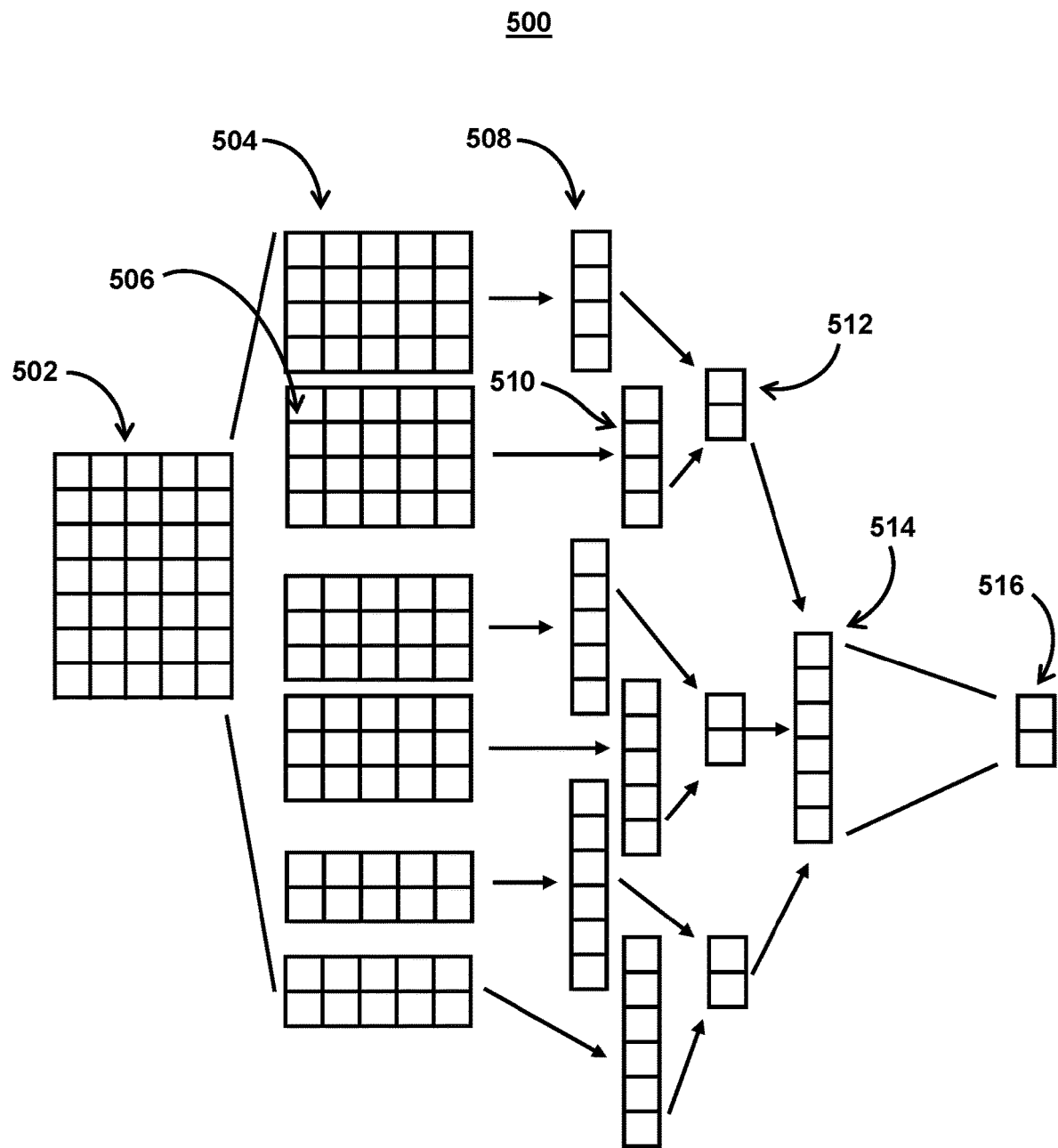
FIG. 5 is an illustrative diagram for processing feature inputs, in accordance with one or more embodiments.

FIG. 5 is an illustrative diagram for processing feature inputs, in accordance with one or more embodiments. For example, diagram 500 may represent the process through which a matrix of values representing a user action is processed. For example, the system (e.g., a mobile application) may generate and respond to user interactions in a user interface (e.g., user interface 100 (FIG. 1)) in order to engage in a conversational interaction with the user and/or select one or more dynamic conversational responses (e.g., for inclusion in a subset of dynamic conversational responses). The conversational interaction may include a back-and-forth exchange of ideas and information between the system and the user. The conversational interaction may proceed through one or more mediums (e.g., text, video, audio, etc.)

For example, the system may include a recommendation engine which recommends quick replies or dynamic conversational responses. For example, the system may receive an output from a machine learning model and use the output to generate a dynamic conversational response. In some embodiments, the system may include multiple conversational responses in a user interface. To do so, the system may first need to process human-readable content into a machine-readable form or a format that may be processed using machine learning models. For example, each conversational response may correspond to a potential intent of the user. For example, the system may generate a subset of dynamic conversational responses from a plurality of dynamic conversational responses based on a determined intent of a user through the use of machine learning models.

For example, the system may comprise a model that predicts an intent of a user. For example, the system may determine if a customer intends to make a credit card payment. To do so, the system may monitor user actions and/or other types of data such as time-dependent user account information (e.g., the due date of a credit card bill, current account balances, etc.). The system may then translate the data into data arrays of numbers using natural language processing. This data, which in some embodiments, may correspond to metadata 600 (FIG. 6)) may include one or more pre-processing steps to generate matrix 502.

For example, in some embodiments, textual data (e.g., representing textual sentences and/or other textual information as it appears on the screen of a user interface (e.g., as described in FIG. 1)). The system may use one or more natural language processing algorithms to contextualize and/or otherwise derive meaning from the text. The system may then translate this context and/or meaning into a vector of data values. This vector of data values may correspond to matrix 502.

For example, the system may process matrix 502 to determine one or more pageviews (e.g., pageview 504 and pageview 506). For example, each pageview may represent a region of matrix 502. The system may identify pageviews by processing the values in matrix 502 to identify boundaries. For example, the boundaries may represent different concepts in textual sentences from which matrix 502 was generated (e.g., using a natural language processing function). Upon detecting a boundary between concepts, the system may process each of the pageviews (e.g., pageview 504 and pageview 506) through a filter (e.g., to generate vectors 508 and 510) and/or one or more convolution layers (e.g., in parallel).

The system may then use an activation function to generate a respective feature map (e.g., feature map 512) for each of the pageviews (e.g., pageview 504 and pageview 506). The system may then use a max pooling function to generate a univariate vector linked together to form a single feature vector (e.g., feature vector 514). Upon the application of a softmax function regularization on feature vector 514, the system generates values for two classes (e.g., classes 516).

FIG. 6 is an illustrative diagram for processing user actions, in accordance with one or more embodiments. For example, the system may receive user action data in the form of metadata 600. Metadata 600 may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata may also include information on how the application and/or the website is set up, i.e., how the individual subpages are linked to one another. The system may then generate a feature input based on this information (e.g., via model 410 or 420).

For example, metadata 600 may represent the user action data that is detected by the system prior to the system generating one or more dynamic conversational responses. For example, as discussed above in relation to FIG. 1 above, the system may retrieve data about a current and/or previous user interaction with the application, webpage or other feature. Additionally or alternatively, the system may retrieve other information (e.g., time-dependent user information and/or transaction data). The system may then create a vector of data values that corresponds to this initial metadata (e.g., metadata 600). The system may represent this vector of data as a matrix (e.g., matrix 502 (FIG. 5)) and/or may perform matrix operations to pre-process this data. This pre-processing may include applying weights to individual values (or representations of a collection of values (e.g., corresponding to a region or pageview) in the matrix as well as identifying importance of given values (e.g., using pooling and/or attention layers).

The system may use metadata 600 to generate pre-processed data 650. For example, to provide better inputs for the machine learning models, the system and methods may first transform textual sentences (e.g., in a webpage as found in a current screen on a user device) into vectors of real values. The system may then convert the resulting matrix using a plurality of attention layers functioning in parallel (e.g., in a first machine learning model). The result of this first machine learning model produces an output in which the various real values are multiped with weights of importance. As such the output comprises modified data, which improves the representation of the original text in the matrix.

In some embodiments, the system may perform one or more pooling functions in order to generate pre-processed data 650. For example, max pooling is a sample-based discretization process. The objective is to down-sample an input representation (image, hidden-layer output matrix, etc.), reducing its dimensionality and allowing for assumptions to be made about features contained in the sub-regions binned. For example, as opposed to average pooling, which calculates the average value for each patch on the feature map, max pooling, calculates the maximum value for each patch of the feature map.

Figure 7:
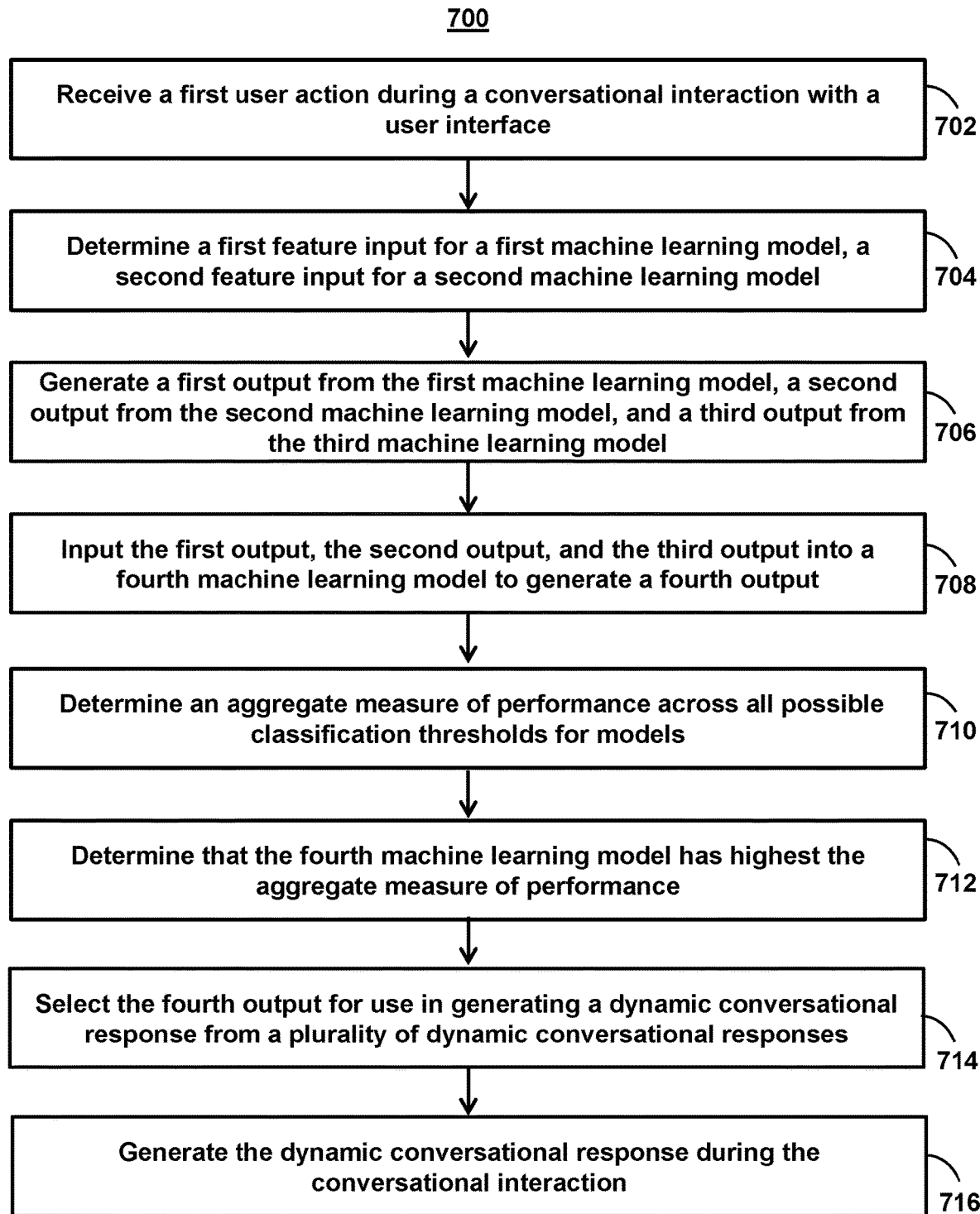
FIG. 7 shows a flowchart of the steps involved in generating dynamic conversational responses using multiple machine learning models, in accordance with one or more embodiments.

FIG. 7 shows a flowchart of the steps involved in generating dynamic conversational responses using multiple machine learning models, in accordance with one or more embodiments. For example, process 700 may represent the steps taken by one or more devices, as shown in FIGS. 1-6, when generating dynamic conversational responses using multiple machine learning models. For example, the dynamic conversational response may comprise an option to pay a bill, an option to view a bank account, etc.

At step 702, process 700 (e.g., using one or more components in system 200 (FIG. 2)) receives a first user action during a conversational interaction with a user interface. For example, the system may receive a first user action during a conversational interaction with a user interface. For example, the first user action may comprise a user accessing an on-line feature (e.g., via a mobile application), launching a webpage, and/or logging into a user account.

At step 704, process 700 (e.g., using one or more components in system 200 (FIG. 2)) determines a first feature input for a first machine learning model. For example, the system may determine, based on the first user action, a first feature input for a first machine learning model, wherein the first machine learning model is trained using a multi-class cross entropy loss function. In some embodiments, the first output may comprise a first plurality of probabilities that summed to one, wherein each of the first plurality of probabilities corresponds to a respective user intent.

For example, the first feature input comprises a matrix, wherein the first output corresponds to a prediction based on a column of the matrix and the second output corresponds to a row of the matrix. Additionally or alternatively, the first feature input may be generated using Bidirectional Encoder Representations from Transformers ("BERT") and/or the first feature input is generated based on textual data using natural language processing.

In some embodiments, the first machine learning model comprises training a single classifier per class, wherein samples of the class are positive samples and all other samples are negative samples. Additionally or alternatively, the first machine learning model may comprise a plurality of convolutional neural networks comprising a first convolutional neural network having a first column size and a second convolutional neural network having a second column size.

At step 706, process 700 (e.g., using one or more components in system 200 (FIG. 2)) determines a second feature input for a second machine learning model. For example, the system may determine, based on the first user action, a second feature input for a second machine learning model, wherein the second machine learning model is trained using a binary cross entropy loss function.

At step 708, process 700 (e.g., using one or more components in system 200 (FIG. 2)) inputs the first feature input into the first machine learning model. For example, the system may input the first feature input into the first machine learning model to generate a first output from the first machine learning model.

At step 710, process 700 (e.g., using one or more components in system 200 (FIG. 2)) inputs the first feature input into the second machine learning model. For example, the system may input the first feature input into the second machine learning model to generate a second output from the second machine learning model. For example, in some embodiments, the second output comprises a second plurality of probabilities that summed do not sum to one, each of the second plurality of probabilities corresponds to a respective user intent.

At step 712, process 700 (e.g., using one or more components in system 200 (FIG. 2)) determines a third output. For example, the system may determine a third output based on a weighted average of the first output and the second output. In some embodiments, the system may determine the third output based on the weighted average of the first output and the second output comprises determining a first weight for the first output and a second weight for the second output, wherein the first weight is greater than the second weight. In some embodiments, the first weight is twice the second weight.

At step 714, process 700 (e.g., using one or more components in system 200 (FIG. 2)) selects a subset of dynamic conversational responses. For example, the system may select a subset of dynamic conversational responses from a plurality of dynamic conversational responses based on the third output.

At step 716, process 700 (e.g., using one or more components in system 200 (FIG. 2)) generates the dynamic conversational response during the conversational interaction. For example, the system may generate, at the user interface, the subset of dynamic conversational responses during the conversational interaction.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-6 could be used to perform one or more of the steps in FIG. 7.

Figure 8:
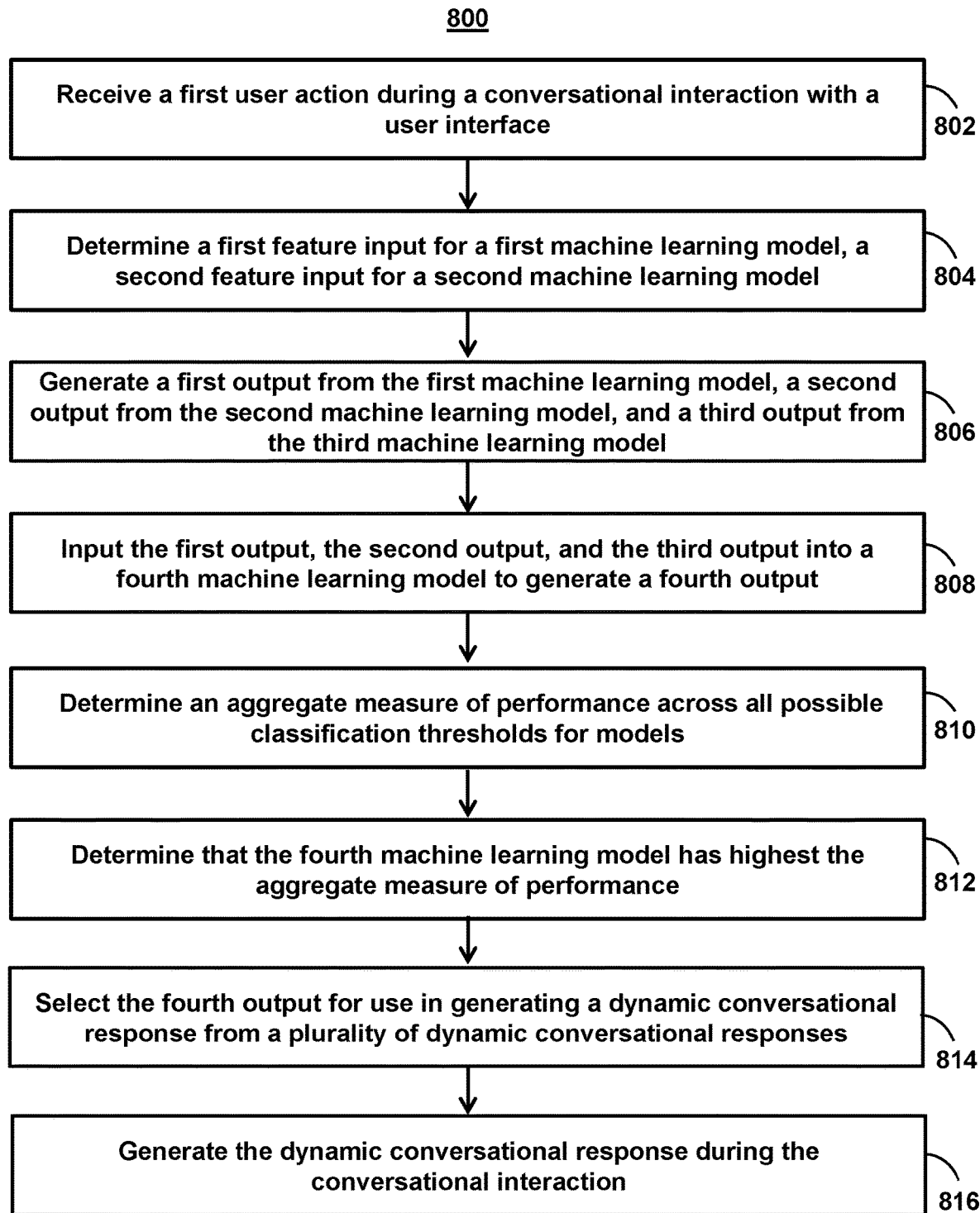
FIG. 8 shows a flowchart of the steps involved in generating dynamic conversational responses through aggregated outputs of machine learning models, in accordance with one or more embodiments.

FIG. 8 shows a flowchart of the steps involved in generating dynamic conversational responses through aggregated outputs of machine learning models, in accordance with one or more embodiments. For example, process 700 may represent the steps taken by one or more devices, as shown in FIGS. 1-6 when generating dynamic conversational responses using multiple machine learning models. For example, the dynamic conversational response may comprise an option to pay a bill, an option to view a bank account, etc.

At step 802, process 800 (e.g., using one or more components in system 200 (FIG. 2)) receives a first user action during a conversational interaction with a user interface. For example, the system may receive a first user action during a conversational interaction with a user interface.

At step 804, process 800 (e.g., using one or more components in system 200 (FIG. 2)) determines a first feature input for a first machine learning model. For example, the system may determine, based on the first user action, a first feature input for a first machine learning model, wherein the first machine learning model comprises a plurality of attention layers functioning in parallel. In some embodiments, the system may determine, based on the first user action, a first feature input for the first machine learning model further comprises transforming text to vectors of real values. Furthermore, transforming text to vectors of real values may comprise generating a matrix of values. For example, the first machine learning model may modify the real values by multiplying them with weights of importance. Additionally or alternatively, the system may generate the first feature input using Bidirectional Encoder Representations from Transformers ("BERT") and/or the first feature input may be generated based on textual data using natural language processing.

At step 806, process 800 (e.g., using one or more components in system 200 (FIG. 2)) inputs the first feature input into the first machine learning model. For example, the system may input the first feature input into the first machine learning model to generate a first output from the first machine learning model, wherein the first machine learning model comprises a plurality of attention layers functioning in parallel.

At step 808, process 800 (e.g., using one or more components in system 200 (FIG. 2)) inputs a first output into a second machine learning model. For example, the system may input the first output into a second machine learning model to generate a second output, wherein the second machine learning model comprises a plurality of convolutional neural networks and a Leaky Rectified Linear Unit ("LeakyReLU") activation function. In some embodiments, the plurality of convolutional neural networks may comprise a first convolutional neural network having a first column size and a second convolutional neural network having a second column size, and wherein the inputting the first output into the second machine learning model to generate the second output comprises processing the first output through the first convolutional neural network and the second convolutional neural network in parallel.

In some embodiments, the first machine learning model and the second machine learning model may be trained by the system together using supervised learning. In some embodiments, the second machine learning model may be trained on top of pre-trained word vectors for sentence-level classification tasks.

At step 810, process 800 (e.g., using one or more components in system 200 (FIG. 2)) selects a dynamic conversational response. For example, the system may select a dynamic conversational response from a plurality of dynamic conversational responses based on the second output. In some embodiments, selecting the dynamic conversational response from the plurality of dynamic conversational responses based on the second output may comprise: inputting the second output into a third machine learning model to generate a third output, wherein the third machine learning model comprises multi-modal stacking; and selecting the dynamic conversational response from the plurality of dynamic conversational responses based on the third output.

At step 812, process 800 (e.g., using one or more components in system 200 (FIG. 2)) generates the dynamic conversational response during the conversational interaction. For example, the system may generate, at the user interface, the dynamic conversational response during the conversational interaction.

It is contemplated that the steps or descriptions of FIG. 8 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-6 could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using multiple machine learning models, the method comprising: receiving a first user action during a conversational interaction with a user interface; determining, based on the first user action, a first feature input for a first machine learning model, wherein the first machine learning model comprises a plurality of attention layers functioning in parallel; inputting the first feature input into the first machine learning model to generate a first output from the first machine learning model, wherein the first machine learning model comprises a plurality of attention layers functioning in parallel; inputting the first output into a second machine learning model to generate a second output, wherein the second machine learning model comprises a plurality of convolutional neural networks and a Leaky Rectified Linear Unit ("LeakyReLU") activation function; selecting a dynamic conversational response from a plurality of dynamic conversational responses based on the second output; and generating, at the user interface, the dynamic conversational response during the conversational interaction.

2. The method of embodiment 1, wherein determining, based on the first user action, a first feature input for the first machine learning model further comprises transforming text to vectors of real values.

3. The method of embodiment 2, wherein transforming text to vectors of real values comprises generating a matrix of values.

4. The method of embodiment 3, wherein the first machine learning model modifies the real values by multiplying them with weights of importance.

5. The method of any one of embodiments 1-4, wherein the first machine learning model and the second machine learning model are trained together using supervised learning.

6. The method of any one of embodiments 1-5, wherein the second machine learning model is trained on top of pre-trained word vectors for sentence-level classification tasks.

7. The method of any one of embodiments 1-6, wherein selecting the dynamic conversational response from the plurality of dynamic conversational responses based on the second output comprises: inputting the second output into a third machine learning model to generate a third output, wherein the third machine learning model comprises multimodal stacking; and selecting the dynamic conversational response from the plurality of dynamic conversational responses based on the third output.

8. The method of any one of embodiments 1-7, wherein the first feature input is generated using Bidirectional Encoder Representations from Transformers ("BERT").

9. The method of any one of embodiments 1-8, wherein the first feature input is generated based on textual data using natural language processing.

10. The method of any one of embodiments 1-9, wherein the plurality of convolutional neural networks comprises a first convolutional neural network having a first column size, and a second convolutional neural network having a second column size, and wherein the inputting the first output into the second machine learning model to generate the second output comprises processing the first output through the first convolutional neural network and the second convolutional neural network in parallel.

11. A method for generating dynamic conversational responses through aggregated outputs of machine learning models, the method comprising: receiving a first user action during a conversational interaction with a user interface; determining, based on the first user action, a first feature input for a first machine learning model, wherein the first machine learning model is trained using a multi-class cross entropy loss function; determining, based on the first user action, a second feature input for a second machine learning model, wherein the second machine learning model is trained using a binary cross entropy loss function; inputting the first feature input into the first machine learning model to generate a first output from the first machine learning model; inputting the first feature input into the second machine learning model to generate a second output from the second machine learning model; determining a third output based on a weighted average of the first output and the second output; selecting a subset of dynamic conversational responses from a plurality of dynamic conversational responses based on the third output; and generating, at the user interface, the subset of dynamic conversational responses during the conversational interaction.

12. The method of embodiment 12, wherein determining the third output based on the weighted average of the first output and the second output comprises determining a first weight for the first output and a second weight for the second output, wherein the first weight is greater than the second weight.

13. The method of embodiment 13, wherein the first weight is twice the second weight.

14. The method of any one of embodiments 11-13, wherein the first output comprises a first plurality of probabilities that summed to one, wherein each of the first plurality of probabilities corresponds to a respective user intent.

15. The method of any one of embodiments 11-14, wherein the second output comprises a second plurality of probabilities that summed do not sum to one, wherein each of the second plurality of probabilities corresponds to a respective user intent.

16. The method of any one of embodiments 11-15, wherein the first feature input comprises a matrix, and wherein the first output corresponds to a prediction based on a column of the matrix, and the second output corresponds to a row of the matrix.

17. The method of any one of embodiments 11-16, wherein the first machine learning model comprises training a single classifier per class, wherein samples of the class are positive samples, and all other samples are negative samples.

18. The method of any one of embodiments 11-17, wherein the first machine learning model comprises a plurality of convolutional neural networks comprising a first convolutional neural network having a first column size, and a second convolutional neural network having a second column size.

19. The method of any one of embodiments 11-18, wherein the first feature input is generated using Bidirectional Encoder Representations from Transformers ("BERT").

20. The method of any one of embodiments 11-19, wherein the first feature input is generated based on textual data using natural language processing.

21. A tangible, non-transitory, machine-readable medium storing instructions that, when executed by a data processing apparatus, cause the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

23. A system comprising means for performing any of embodiments 1-20.

What is claimed is:

1. A system for generating dynamic conversational responses through aggregated outputs of machine learning models, the system comprising:
    storage circuitry configured to store:
        a first machine learning model, wherein the first machine learning model is trained using a multi-class cross entropy loss function; and
        a second machine learning model, wherein the second machine learning model is trained using a binary cross entropy loss function;
    control circuitry configured to:
        receive a first user action during a conversational interaction with a user interface;
        generate a first output from the first machine learning model;
        generate a second output from the second machine learning model;

determine a third output based on a weighted average of the first output and the second output; and select a subset of the dynamic conversational responses from a plurality of dynamic conversational responses based on the third output; and input/output circuitry configured to:
generate, at the user interface, the subset of the dynamic conversational responses during the conversational interaction.

2. A method for generating dynamic conversational responses through aggregated outputs of machine learning models, the method comprising:

receiving a first user action during a conversational interaction with a user interface;

generating a first output from a first machine learning model based on the first user action, wherein the first machine learning model is trained using a multi-class cross entropy loss function;

generating a second output from a second machine learning model based on the first user action, wherein the second machine learning model is trained using a binary cross entropy loss function;

determining a third output based on a weighted average of the first output and the second output;

selecting a subset of dynamic conversational responses from a plurality of dynamic conversational responses based on the third output; and generating, at the user interface, the subset of dynamic conversational responses during the conversational interaction.

3. The method of claim 2, wherein the first output comprises a first plurality of probabilities that summed to one, wherein each of the first plurality of probabilities corresponds to a respective user intent.

4. The method of claim 2, wherein the second output comprises a second plurality of probabilities that summed do not sum to one, wherein each of the second plurality of probabilities corresponds to a respective user intent.

5. The method of claim 2, further comprising determining a first feature input for the first machine learning model, wherein the first feature input comprises a matrix, and wherein the first output corresponds to a prediction based on a column of the matrix and the second out-put corresponds to a row of the matrix.

6. The method of claim 2, wherein the first machine learning model comprises training a single classifier per class, wherein samples of the class are positive samples and all other samples are negative samples.

7. The method of claim 2, wherein the first machine learning model comprises a plurality of convolutional neural networks comprising a first convolutional neural network having a first column size and a second convolutional neural network having a second column size.

8. The method of claim 2, further comprising determining a first feature input for the first machine learning model, wherein the first feature input is generated using Bidirectional Encoder Representations from Transformers ("BERT").

9. The method of claim 2, further comprising determining a first feature input for the first machine learning model, wherein the first feature input is generated based on textual data using natural language processing.

10. The method of claim 2, wherein determining the third output based on the weighted average of the first output and the second output comprises determining a first weight for the first output and a second weight for the second output, wherein the first weight is greater than the second weight.

11. The method of claim 10, wherein the first weight is twice the second weight.

12. A non-transitory computer-readable medium comprising of instructions that, when executed by one or more processors, cause operations comprising:

receiving a first user action during a conversational interaction with a user interface;

generating a first output from a first machine learning model, wherein the first machine learning model is trained using a multi-class cross entropy loss function;

generating a second output from a second machine learning model, wherein the second machine learning model is trained using a binary cross entropy loss function;

determining a third output based on a weighted average of the first output and the second output;

selecting a subset of dynamic conversational responses from a plurality of dynamic conversational responses based on the third output; and generating, at the user interface, the subset of dynamic conversational responses during the conversational interaction.

13. The non-transitory computer-readable medium of claim 12, wherein determining the third output based on the weighted average of the first output and the second output comprises determining a first weight for the first output and a second weight for the second out-put, wherein the first weight is greater than the second weight.

14. The non-transitory computer-readable medium of claim 13, wherein the first weight is twice the second weight.

15. The non-transitory computer-readable medium of claim 12, wherein the first output comprises a first plurality of probabilities that summed to one, wherein each of the first plurality of probabilities corresponds to a respective user intent.

16. The non-transitory computer-readable medium of claim 12, wherein the second output comprises a second plurality of probabilities that summed do not sum to one, wherein each of the second plurality of probabilities corresponds to a respective user intent.

17. The non-transitory computer-readable medium of claim 12, wherein the instructions further cause operations comprising determining a first feature input for the first machine learning model, wherein the first feature input comprises a matrix, and wherein the first output corresponds to a prediction based on a column of the matrix and the second output corresponds to a row of the matrix.

18. The non-transitory computer-readable medium of claim 12, wherein the first machine learning model comprises training a single classifier per class, wherein samples of the class are positive samples and all other samples are negative samples.

19. The non-transitory computer-readable medium of claim 12, wherein the first machine learning model comprises a plurality of convolutional neural networks comprising a first convolutional neural network having a first column size and a second convolutional neural network having a second column size.

20. The non-transitory computer-readable medium of claim 12, wherein the instructions further cause operations comprising determining a first feature input for the first machine learning model, and wherein the first feature input is generated based on textual data using natural language processing.

* * * * *